No. 897,340. PATENTED SEPT. 1, 1908.
F. B. BEINKAMP & L. L. HARDING.
COMBINATION VOCAL AND INSTRUMENTAL MUSIC SHEET.
APPLICATION FILED AUG. 19, 1907.
2 SHEETS—SHEET 1.
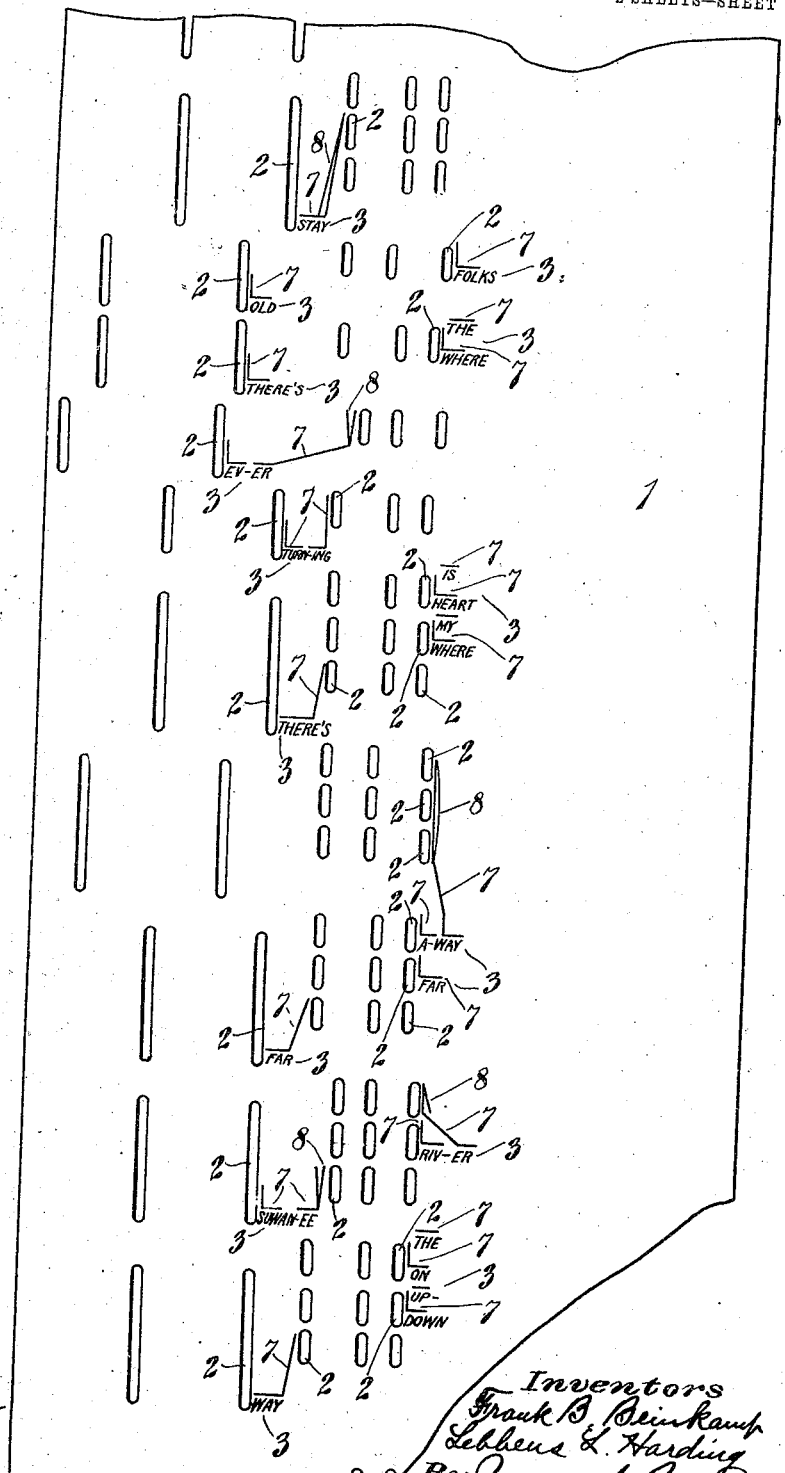

No. 897,340.
PATENTED SEPT. 1, 1908.
F. B. BEINKAMP & L. L. HARDING.
COMBINATION VOCAL AND INSTRUMENTAL MUSIC SHEET.
APPLICATION FILED AUG. 19, 1907.
2 SHEETS—SHEET 2.
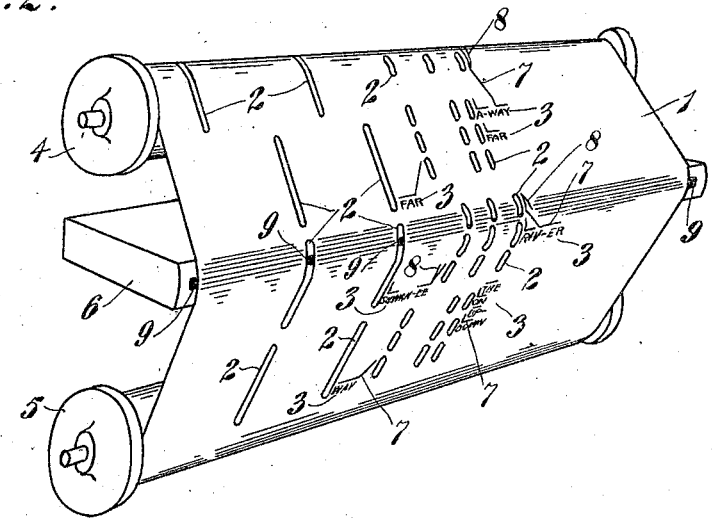
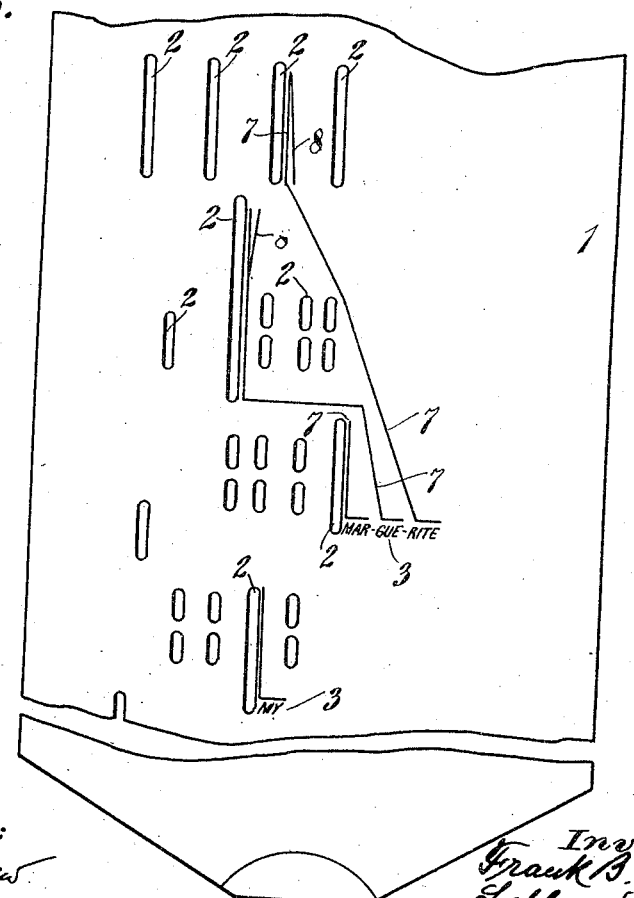

UNITED STATES PATENT OFFICE.

FRANK B. BEINKAMP, OF CINCINNATI, OHIO, AND LEBBEUS L. HARDING, OF CANON CITY, COLORADO.

COMBINATION VOCAL AND INSTRUMENTAL MUSIC SHEET.

No. 897,340.     Specification of Letters Patent.     Patented Sept. 1, 1908.

Application filed August 19, 1907. Serial No. 389,161.

*To all whom it may concern:*

Be it known that we, FRANK B. BEINKAMP and LEBBEUS L. HARDING, citizens of the United States, residing, respectively, in Cincinnati, in the county of Hamilton and State of Ohio, and in Canon City, in the county of Fremont and State of Colorado, have invented certain new and useful Improvements in a Combination Vocal and Instrumental Music Sheet, of which the following is a specification.

Our invention relates to means for enabling a singer to measure the distance or space upon a music sheet for automatic musical instruments over which the word should be held in singing, the object being to arrange the words upon the music sheet in such a way as to enable the operator of the musical instrument to sing the words in exact unison with the music rendered by the instrument.

Our invention consists in providing an apertured sheet of paper adapted to be wound upon a roll with words arranged adjacent to the apertures therein, and with characters adapted to indicate by lineal extent the space over which the words or syllables thereof should be held by the singer.

In the drawing: Figure 1 is a view of part of a music sheet embodying our invention. Fig. 2 is a perspective view showing our invention mounted upon the rolls of an automatic musical instrument and passing over the tracker-board thereof. Fig. 3 is another view of a music sheet illustrating a further adaptation of our invention.

We provide a sheet of apertured paper 1 (having apertures 2 arranged therein in the usual manner to be used in producing automatic instrumental music) with words 3 comprising a song, the sentences of which are arranged longitudinally thereof, while the words of the sentences are disposed transversely of the sheet and adjacent to the apertures therein, so that as the sheet 1 is passing from the roll 4 to the roll 5 over the tracker-board 6 of an automatic musical instrument, by means of which the action of the musical instrument is controlled, the words of the song may be read and sung in exact unison with the music being rendered by the instrument. A lineal character or line 7 is placed adjacent each word or syllable and extends therefrom to and along one or more of the apertures 2 to indicate the distance or space over which such word or syllable should be held by the singer or to indicate the times at which the several vocal tones should be sustained. A horizontal line above a word without any character extending therefrom along the aperture or apertures indicates that the word is to be spoken quickly and is not to be held as when the character extends along the aperture or apertures. We preferably provide the characters 7 with marks 8 to indicate the volume of sound to be produced in singing said words over the space covered by said marks, the sound to increase or diminish in volume in proportion to the distance of said mark from said character. The passing of the words, characters and marks across the opening 9 of the tracker-board 6 indicates to the singer when the words of the song should be uttered. This enables a person who is not familiar with the words of a song or the time thereof, to sing it in unison with the music produced upon the instrument.

We have shown in Fig. 3 a part of a sheet of music illustrating the manner of indicating by the characters 7, the distance over which each syllable of a word of three syllables should be held by the singer with marks 8 denoting the increase and decrease of volume.

We are aware that it is not new to employ words opposite the apertures in a sheet of music paper for automatic instruments, the words being so arranged as to indicate by their position the time at which they should be sung to correspond with the tune to which they are set. It has also been proposed to combine with music sheets having apertures a set of musical notes of ordinary significance to indicate to an operator who is skilled in music the character of the composition being rendered by the instrument. But we believe it to be original with us to employ in connection with printed words peculiar visible characters upon a movable apertured music sheet, the characters not only being placed adjacent to their corresponding note apertures, but indicating by their lineal extent upon the movable sheet the precise length of time the several vocal tones should be sustained. By this fact it is not necessary for the operator or performer to be versed in reading ordinary musical notation in order to successfully render the vocal music.

This invention would increase the sale of player pianos and also the sale of music. It would provide amusement and recreation for those who are not educated in singing, yet have a longing for the old established songs, such as, "The Suwanee River," "Old Folks at Home," "Old Kentucky Home," etc. With a player piano and a music roll marked as herein indicated, it would enable those who love this class of songs as well as those who care for the most classical songs, and who are unable to produce the same, to do so in a very satisfactory manner. It would educate in singing a great number of people who otherwise would not become interested, the old line of learning being too tedious and expensive.

We claim:

1. The herein described sheet for automatic musical instruments, said sheet having note apertures of varying lengths, syllables comprising words of a song to indicate those note apertures corresponding thereto, and lineal characters adjacent to said syllables, said characters being composed of lines extending from each syllable to and along said note apertures as far as said syllable is to be held by the singer.

2. The combination, with a tracker-board and rollers of an automatic musical instrument, of a music sheet connected with said rollers and coöperating with said tracker-board, said sheet being provided with note apertures, syllables comprising words of a song arranged to indicate those note apertures corresponding thereto, and lineal characters arranged adjacent to said syllables and extending therefrom in the direction of movement of the sheet, said lineal characters being of varying extent to indicate the varying times at which the several vocal tones should be sustained.

3. The combination, with a tracker-board and rollers of an automatic musical instrument, of a music sheet connected with said rollers and coöperating with said tracker-board, said sheet being provided with note apertures, syllables comprising words of a song arranged to indicate those note apertures corresponding thereto, and lineal characters arranged adjacent to said syllables and extending therefrom in the direction of movement of the sheet, said lineal characters being of varying extent and arrangement to indicate the varying volume of tones and times at which the several vocal tones should be sustained.

FRANK B. BEINKAMP.
LEBBEUS L. HARDING.

Witnesses:
JAMES N. RAMSEY,
CLARENCE PERDEW.